United States Patent
Masunaga et al.

(10) Patent No.: US 12,280,785 B2
(45) Date of Patent: Apr. 22, 2025

(54) CONTROL APPARATUS FOR VEHICLE

(71) Applicant: TOYOTA JIDOSHA KABUSHIKI KAISHA, Toyota (JP)

(72) Inventors: Seiji Masunaga, Toyota (JP); Shingo Eto, Gamagori (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 18/148,739

(22) Filed: Dec. 30, 2022

(65) Prior Publication Data

US 2023/0234591 A1 Jul. 27, 2023

(30) Foreign Application Priority Data

Jan. 13, 2022 (JP) .................................. 2022-003911

(51) Int. Cl.
*B60W 30/20* (2006.01)
*B60W 10/02* (2006.01)
*B60W 10/06* (2006.01)
*B60W 10/08* (2006.01)

(52) U.S. Cl.
CPC ............ *B60W 30/20* (2013.01); *B60W 10/02* (2013.01); *B60W 10/06* (2013.01); *B60W 10/08* (2013.01); *B60W 2710/021* (2013.01)

(58) Field of Classification Search
CPC ...... B60W 30/20; B60W 10/02; B60W 10/08; B60W 2710/021; B60W 30/19; Y02T 10/62; B60K 6/48; B60K 6/54
See application file for complete search history.

(56) References Cited

U.S. PATENT DOCUMENTS

| 5,613,583 A | * | 3/1997 | Kono .................... F16H 61/143 |
| | | | 477/906 |
| 2018/0244276 A1 | * | 8/2018 | Imamura ............... B60W 30/20 |
| 2022/0306075 A1 | * | 9/2022 | Fukao .................... B60K 6/547 |

FOREIGN PATENT DOCUMENTS

| JP | 2009-255628 A | 11/2009 |
| JP | 2009-284676 A | 12/2009 |

* cited by examiner

*Primary Examiner* — Faris S Almatrahi
*Assistant Examiner* — Dana F Artimez
(74) *Attorney, Agent, or Firm* — Oliff PLC

(57) ABSTRACT

A control apparatus for a vehicle that includes a power transmission apparatus including a frictional engagement element configured to connect and disconnect transmission of a power between a drive power source and drive wheels of the vehicle. The control apparatus is configured to execute a vibration suppression control for estimating torsional vibration of the power transmission apparatus, based on a preformulated vibration model, and controlling a torque of a rotating machine that is connected to the power transmission apparatus, so as to suppress the torsional vibration. The control apparatus allows execution of the vibration suppression control, when the frictional engagement element is in an engaged state, and also when a differential rotation of the frictional engagement element has become smaller than a predetermined determination value even with the frictional engagement element being in a disengaged state.

5 Claims, 7 Drawing Sheets

|     | C1 | C2 | C3 | B1 | B2  | F1 |
|-----|----|----|----|----|-----|----|
| 1st | O  |    |    |    | (O) | O  |
| 2nd | O  |    |    | O  |     |    |
| 3rd | O  | O  |    |    |     |    |
| 4th |    | O  |    | O  |     |    |
| Rev |    |    | O  |    | O   |    |
| N   |    |    |    |    |     |    |

(O:ENGAGED  BLANK:RELEASED)

K0-ENGAGED-CASE VIBRATION MODEL Mhev

K0-RELEASED-CASE VIBRATION MODEL Mbev

CONTROL APPARATUS FOR VEHICLE

This application claims priority from Japanese Patent Application No. 2022-003911 filed on Jan. 13, 2022, the disclosure of which is herein incorporated by reference in its entirety.

FIELD OF THE INVENTION

The present invention relates to a control apparatus for a vehicle, and more particularly, to techniques of suppressing torsional vibration in a power transmission apparatus, by controlling a torque of a rotating machine.

BACKGROUND OF THE INVENTION

Each of JP-2009-284676A and JP-2009-255628A discloses techniques of a vibration suppression control for estimating torsional vibration of a power transmission apparatus of a vehicle, based on a preformulated vibration model, and controlling a torque of a rotating machine that is connected to the power transmission apparatus, so as to suppress the torsional vibration. Further, JP-2009-255628A discloses the vehicle provided with the power transmission apparatus including a transmission (transmission 500) and a frictionally-engaging direct clutch (lock-up mechanism of a torque converter 400) that are arranged in a series with each other between a drive power source and drive wheels, wherein the transmission is configured to establish a plurality of gear positions having respective different gear ratios, depending on operation states of respective frictional engagement devices.

SUMMARY OF THE INVENTION

By the way, it is preferable to inhibit execution of the vibration suppression control when transmission of a power is disconnected or limited, for example, during a shift control of the transmission or during a non-engagement control of the direct clutch. That is, since the vibration model used in the vibration suppression control is formulated based on a power transmission state, a rotational speed of the rotating machine could be excessively increased or reduced by control of the torque of the rotating machine in the event of slip between rotary members in the power transmission path, so that drivability (e.g., ride comfort) is likely to be affected due to increase of NV (Noise and Vibration). Further, the effect of the vibration suppression control is obtained with a certain response delay, because data collected for a certain length of time to a current point of time is required to estimate the torsional vibration by the vibration model. If the vibration suppression control is suspended until the shift control of the transmission is completed or until the direct clutch is brought into an engaged state from a disengaged state, the vibration suppression control is practically ineffective for a large length of time that corresponds to a sum of a time of collection of the data and a time of inhibition of the execution of the vibration suppression control during the shift control of the transmission or during the non-engagement control of the direct clutch, so that the torsional vibration could be undesirably increased.

The present invention was made in view of the background art described above. It is therefore an object of the present invention to suppress increase of torsional vibration of a power transmission apparatus due to inhibition of execution of a vibration suppression control, which is made when transmission of a power is disconnected or limited, for example, during a shift control of a transmission of the power transmission apparatus, wherein the vibration suppression control is executed to suppress the torsional vibration of the power transmission apparatus by estimating the torsional vibration with use of a vibration model.

The object indicated above is achieved according to the following aspects of the present invention.

According to a first aspect of the invention, there is provided a control apparatus for a vehicle that includes a drive power source, drive wheels, and a power transmission apparatus which is disposed between the drive power source and the drive wheels and which includes a frictional engagement element configured to connect and disconnect transmission of a power between the drive power source and the drive wheels. The control apparatus comprising a vibration-suppression control portion configured to execute a vibration suppression control for estimating torsional vibration of the power transmission apparatus, based on a preformulated vibration model, and controlling a torque of a rotating machine that is connected to the power transmission apparatus, so as to suppress the torsional vibration. The vibration-suppression control portion includes a vibration-suppression allowing/inhibiting portion which is configured to allow and inhibit execution of the vibration suppression control. The vibration-suppression allowing/inhibiting portion is configured to allow the execution of the vibration suppression control, when the frictional engagement element is in an engaged state, and when a differential rotation of the frictional engagement element has become smaller than a predetermined determination value even with the frictional engagement element being in a disengaged state. The vibration-suppression allowing/inhibiting portion is configured to inhibit the execution of the vibration suppression control, when the differential rotation of the frictional engagement element is not smaller than the determination value with the frictional engagement element being in the disengaged state.

According to a second aspect of the invention, in the control apparatus according to the first aspect of the invention, the power transmission apparatus includes a transmission which includes a plurality of frictional engagement devices each constituted by the frictional engagement element and which is configured to establish a plurality of gear positions providing respective different gear ratios, depending on operation states (engaged/released states) of the frictional engagement devices, wherein the control apparatus comprises a shift control portion configured to switch the gear positions of the transmission, by controlling operation states of the frictional engagement devices, wherein the vibration-suppression allowing/inhibiting portion is configured to allow the execution of the vibration suppression control, when the transmission is not in a shift control for switching from one of the gear positions to another of the gear positions, and when the differential rotation of a shifting-execution engagement device, which is one of the frictional engagement devices that is to be engaged in the shift control, has become smaller than an engagement-device-operation-related determination value as the determination value even with the transmission being in the shift control, and wherein the vibration-suppression allowing/inhibiting portion is configured to inhibit the execution of the vibration suppression control, when the differential rotation of the differential rotation is not smaller than the engagement-device-operation-related determination value with the transmission being in the shift control.

According to a third aspect of the invention, in the control apparatus according to the first aspect of the invention, the power transmission apparatus includes a direct clutch that is constituted by the frictional engagement element, wherein the control apparatus comprises a direct-clutch control portion configured to control an operation state of the direct clutch, wherein the vibration-suppression allowing/inhibiting portion is configured to allow the execution of the vibration suppression control, when the direct clutch is in the engaged state, and when the differential rotation of the direct clutch is smaller than a direct-clutch-operation-related determination value as the determination value even with the direct clutch being in the disengaged state, and wherein the vibration-suppression allowing/inhibiting portion is configured to inhibit the execution of the vibration suppression control, when the differential rotation of the direct clutch is not smaller than the direct-clutch-operation-related determination value with the direct clutch being in the disengaged state.

According to a fourth aspect of the invention, in the control apparatus according to the first aspect of the invention, the power transmission apparatus includes (a) a direct clutch that is constituted by the frictional engagement element and (b) a transmission which includes a plurality of frictional engagement devices each constituted by the frictional engagement element and which is configured to establish a plurality of gear positions providing respective different gear ratios, depending on operation states of the frictional engagement devices each constituted by the frictional engagement element, such that the direct clutch and the transmission are arranged in a series with each other, wherein the control apparatus comprises a shift control portion configured to switch the gear positions of the transmission, by controlling operation states of the frictional engagement devices, and a direct-clutch control portion configured to control an operation state of the direct clutch, wherein the vibration-suppression allowing/inhibiting portion is configured to allow the execution of the vibration suppression control, when an engagement-device-operation-related allowance condition and a direct-clutch-operation-related allowance condition are both satisfied, wherein the engagement-device-operation-related allowance condition is satisfied (i) when the transmission is not in a shift control for switching from one of the gear positions to another of the gear positions, and (ii) when the differential rotation of a shifting-execution engagement device, which is one of the frictional engagement devices that is to be engaged in the shift control, is smaller than an engagement-device-operation-related determination value as the determination value, even with the transmission being in the shift control, and wherein the direct-clutch-operation-related allowance condition is satisfied (iii) when the direct clutch is in the engaged state, and (iv) when the differential rotation of the direct clutch is smaller than a direct-clutch-operation-related determination value as the determination value even with the direct clutch being in the disengaged state, wherein the vibration-suppression allowing/inhibiting portion is configured to inhibit the execution of the vibration suppression control, when either an engagement-device-operation-related inhibition condition or a direct-clutch-operation-related inhibition condition is satisfied, wherein the engagement-device-operation-related inhibition condition is satisfied (v) when the differential rotation of the shifting-execution engagement device is not smaller than the engagement-device-operation-related determination value with the transmission being in the shift control, and wherein the direct-clutch-operation-related inhibition condition is satisfied (vi) when the differential rotation of the direct clutch is not smaller than the direct-clutch-operation-related determination value with the direct clutch being in the disengaged state.

According to a fifth aspect of the invention, in the control apparatus according to any one of the first through fourth aspects of the invention, the vehicle is an electrically-operated vehicle including a drive rotating machine as the drive power source, wherein the vibration-suppression control portion is configured to execute the vibration suppression control by controlling the torque of the drive rotating machine as the rotating machine.

In the control apparatus according to any one of the first through fifth aspects of the invention, the execution of the vibration suppression control is allowed not only when the frictional engagement element is in the engaged state but also when the differential rotation of the frictional engagement element has become smaller than the predetermined determination value even with the frictional engagement element being in the disengaged state, so that it is possible to reduce an ineffective period in which the vibration suppression control is ineffective when the transmission of the power is disconnected or limited by the frictional engagement element, for example, during the shift control or during the non-engagement control of the direct clutch, and accordingly to suppress increase of the torsional vibration. Since the frictional engagement element already has a certain amount of engagement torque when the differential rotation has become smaller than the determination value shortly before the frictional engagement element is placed into the engaged state, the rotational speed of the rotating machine is unlikely to be excessively increased or reduced by execution of the vibration suppression control shortly before placement of the frictional engagement element into the engaged state. Therefore, by starting the vibration suppression control in advance at a point of time at which the differential rotation has become smaller than the determination value, it is possible to more suppress increase of the torsional vibration due to delay of effect of the vibration suppression control, as compared with a control arrangement in which the vibration suppression control is not started until the frictional engagement element is placed into the engaged state.

In the control apparatus according to the second aspect of the invention in which the frictional engagement element constitutes each of the frictional engagement devices of the transmission, the execution of the vibration suppression control is allowed not only when the transmission is not in the shift control for switching from one of the gear positions to another of the gear positions but also when the differential rotation of the shifting-execution engagement device has become smaller than the engagement-device-operation-related determination value even with the transmission being in the shift control, so that it is possible to reduce the ineffective period of the vibration suppression control during execution of the shift control and accordingly to suppress increase of the torsional vibration. That is, the vibration suppression control is started in advance at a point of time at which the differential rotation of the shifting-execution engagement device has become smaller than the engagement-device-operation-related determination value shortly before the shift control is completed, so that it is possible to more suppress increase of the torsional vibration due to delay of effect of the vibration suppression control, as compared with a control arrangement in which the vibration suppression control is not started until the shift control is completed.

In the control apparatus according to the third aspect of the invention in which the frictional engagement element constitutes the direct clutch, the execution of the vibration suppression control is allowed not only when the direct clutch is in the engaged state but also when the differential rotation of the direct clutch is smaller than the direct-clutch-operation-related determination value as the determination value even with the direct clutch being in the disengaged state, so that it is possible to reduce the ineffective period of the vibration suppression control during the disengaged state of the direct clutch and accordingly to suppress increase of the torsional vibration. That is, the vibration suppression control is started in advance at a point of time at which the differential rotation of the direct clutch has become smaller than the direct-clutch-operation-related determination value shortly before the direct clutch is switched from the disengaged state to the engaged state, so that it is possible to more suppress increase of the torsional vibration due to delay of effect of the vibration suppression control, as compared with a control arrangement in which the vibration suppression control is not started until the direct clutch is placed in the engaged state. Further, the execution of the vibration suppression control is allowed as long as the differential rotation of the direct clutch is smaller than the direct-clutch-operation-related determination value shortly after start of the transition control for switching the direct clutch from the engaged state to the disengaged state, so that the ineffective period of the vibration suppression control is further reduced.

In the control apparatus according to the fourth aspect of the invention in which substantially all of features included in the second and third aspects of the invention are included, it is possible to obtain substantially the same effects as in the second and third aspects of the invention. Further, the execution of the vibration suppression control is inhibited when either the engagement-device-operation-related inhibition condition or the direct-clutch-operation-related inhibition condition is satisfied, namely, the execution of the vibration suppression control is inhibited when the differential rotation of the shifting-execution engagement device is not smaller than the engagement-device-operation-related determination value with the transmission being in the shift control and also when the differential rotation of the direct clutch is not smaller than the direct-clutch-operation-related determination value with the direct clutch being in the disengaged state. Thus, even when the differential rotation of one the shifting-execution engagement device and the direct clutch is smaller than the determination value, the vibration suppression control is not executed so that it is possible to prevent increase of the NV due to excessive increase or reduction of the rotational speed of the rotating machine that could be caused by execution of the vibration suppression control.

DETAILED DESCRIPTION OF PREFERRED EMBODIMENT

Figure 1:
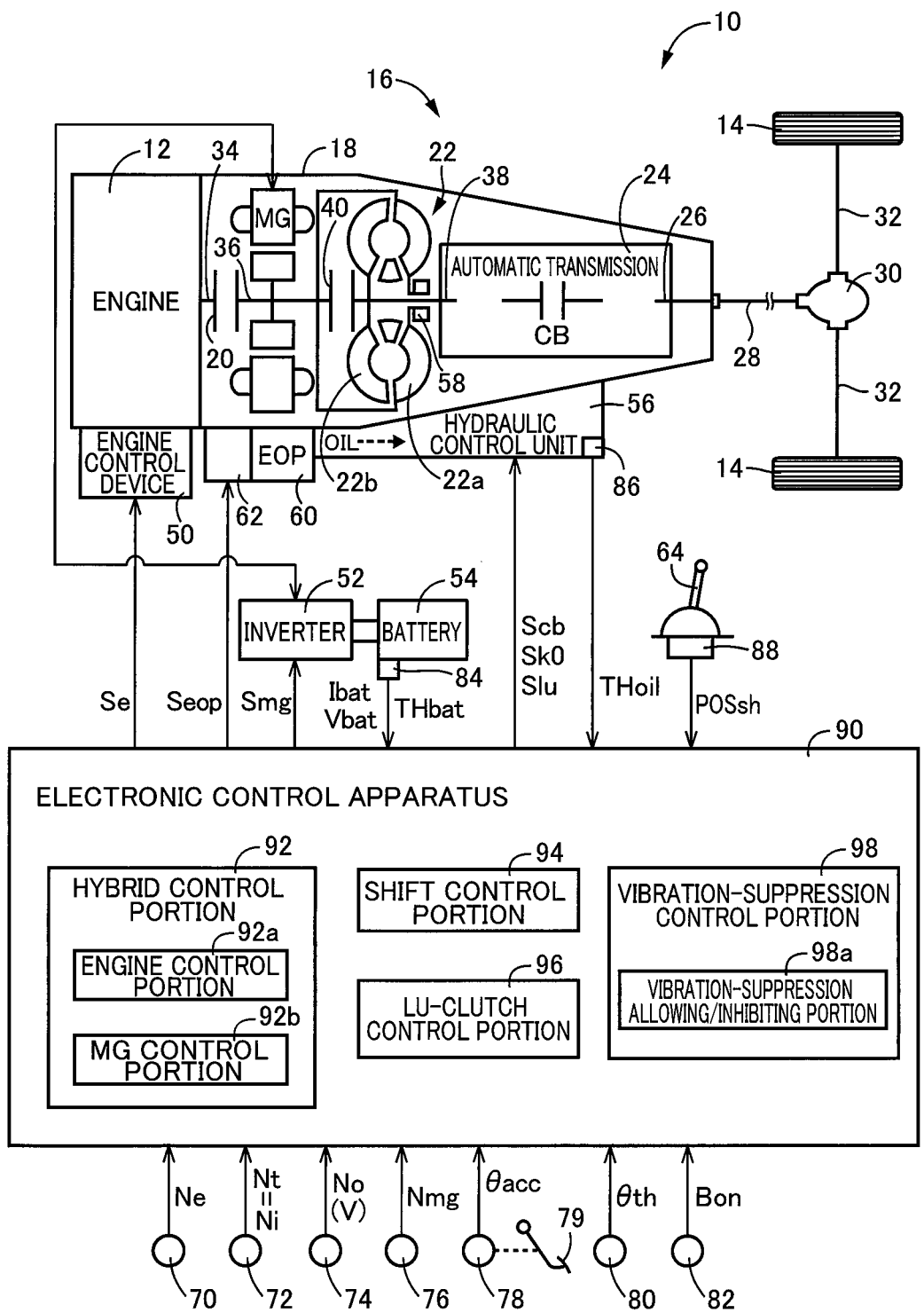
FIG. 1 is a view schematically showing a construction of a drive system of a hybrid electrically-operated vehicle including a control apparatus in the form of an electronic control apparatus as an embodiment of the present invention, together with major portions of control functions and systems for executing various kinds of controls in the hybrid electrically-operated vehicle.

The present invention is applied advantageously to an electrically-operated vehicle including a drive rotating machine as the drive power source. Although the vibration suppression control can be executed by using the drive rotating machine, it may be also executed by using a rotating machine that is provided apart from the drive power source to execute the vibration suppression control, so that the invention is applicable also to various kinds of vehicles such as an engine drive vehicle that includes only an engine as the drive power source. The electrically-operated vehicle may be either an electric vehicle including the drive rotating machine as the drive power source or a hybrid electrically-operated vehicle including the drive rotating machine and the engine as the drive power sources. The engine is an internal combustion engine such as gasoline engine and diesel engine, which is configured to generate a power by combustion of fuel. Although the drive rotating machine is constituted advantageously by a motor generator serving as an electric motor and also an electric power generator, it may be constituted also by an electric motor without function serving as an electric power generator. Although the drive rotating machine can be used as the rotating machine for executing the vibration suppression control, the vibration suppression control may be also executed by using a rotating machine that is provided, in addition to the drive rotating machine, to serve to exclusively execute the vibration suppression control. As this rotating machine serving to exclusively execute the vibration suppression control, too, a motor generator serving as the electric motor and the electric power generator is advantageously used.

The power transmission apparatus includes, for example, a transmission which includes a plurality of frictional engagement devices and which is configured to establish a plurality of gear positions providing respective different gear ratios, depending on operation states of the frictional engagement devices, and a direct clutch constituted by a frictional engagement element, such that the transmission and the direct clutch are disposed in series with each other. However, the power transmission apparatus may include only one of the transmission and the direct clutch, or may include another frictional engagement element in addition to or in place of the transmission and the direct clutch. Although the transmission is constituted advantageously by a step variable transmission configured to establish a plurality of forward-drive gear positions, it may be constituted also by a step variable transmission configured to establish a plurality of reverse-drive gear positions. In either of these cases, a shifting action is executed, for example, depending an operation state of the vehicle, so that the transmission of the power is disconnected or limited during the shifting action whereby the vibration suppression control based on the vibration model could be affected. Where the frictional engagement element, by which the vibration suppression control could be affected, is additionally provided, it is also possible to use a continuously-variable transmission of belt type, for example. The direct clutch is, for example, an LU (lockup) clutch that is configured to directly connect between an input rotary member and an output rotary member of a torque converter or other fluid transmission device that is disposed between the transmission and the drive power source. However, the direct clutch may be constituted by a differential limitation clutch or other frictional engagement device that is to be controlled to be selectively engaged or released depending on the operation state of the vehicle.

The vibration-suppression allowing/inhibiting portion may be configured to allow the execution of the vibration suppression control, when determining that the differential rotation of the frictional engagement element is smaller than the predetermined determination value, even with the frictional engagement element being in the disengaged state. However, it is also possible to provide another condition in addition to the condition related to the differential rotation of the frictional engagement element, such that the execution of the vibration suppression control is allowed when all of the conditions are satisfied. In this case, the additional condition may be, for example, a condition related to an estimated value of a transmission torque capacity which can be obtained based on a torque command value supplied to the frictional engagement element, or a condition related to an absolute value of rate of change of the differential rotation of the frictional engagement element. The additional condition or conditions do not necessarily have to be provided and may be omitted, as long as the condition related to differential rotation of the frictional engagement element is provided as a minimum required condition, namely, as long as the differential rotation of the frictional engagement element needs to be reduced to be smaller than the determination value, for allowing the execution of the vibration suppression control. Further, although the execution of the vibration suppression control is allowed depending on the determination made by the vibration-suppression allowing/inhibiting portion, it is also possible to set an upper limit of a damping torque (vibration suppression torque) of the rotating machine such that the execution of the vibration suppression control is limited or inhibited when the damping force of the rotating machine exceeds the upper limit.

Where the frictional engagement element constitutes the direct clutch, in a case in which the differential rotation of the direct clutch is smaller than the direct-clutch-operation-related determination value even with the direct clutch being in the disengaged state, the execution of the vibration suppression control is allowed not only (a) when the differential rotation of the direct clutch has been reduced from a value not smaller than the direct-clutch-operation-related determination value to a value smaller than the direct-clutch-operation-related determination value, shortly before the direct clutch is switched from the disengaged state to the engaged state, but also (b) when the differential rotation of the direct clutch is still smaller than the direct-clutch-operation-related determination value, shortly after a transition control is started to switch the direct clutch from the engaged state to the disengaged state. However, it is also possible to modify this control arrangement, such that the execution of the vibration suppression control is allowed only (a) shortly before the direct clutch is switched from the disengaged state to the engaged state, and such that the execution of the vibration suppression control is inhibited (b) shortly after start of the transition control even with the differential rotation of the direct clutch being smaller than the direct-clutch-operation-related determination value. Further, where the frictional engagement element constitutes another part or device other than the direct clutch, too, the execution of the vibration suppression control may be allowed not only when the differential rotation of the frictional engagement element has become smaller than the determination value but also the differential rotation of the frictional engagement element is still smaller than the determination value shortly after the transition control is started to switch the frictional engagement element from the engaged state to the disengaged state. Regarding the transmission, where one of the frictional engagement devices of the transmission is to be released in the shift control, the execution of the vibration suppression control may be allowed also when the differential rotation of the one of the frictional engagement devices is smaller than a predetermined determination value.

Embodiment

There will be described an embodiment of the present invention in details with reference to drawings. It is noted that figures of the drawings are simplified or deformed as needed, and each portion is not necessarily precisely depicted in terms of dimension ratio, angle, shape, etc.

FIG. 1 is a view schematically showing a construction of a drive system of a hybrid electrically-operated vehicle 10 (hereinafter simply referred to as "vehicle 10") including an electronic control apparatus 90 as an embodiment of the present invention, together with major portions of control functions and systems for executing various kinds of controls in the vehicle 10. As shown in FIG. 1, the vehicle 10 is a parallel-type hybrid electrically-operated vehicle including an engine 12 and a rotating machine MG as drive power sources for driving the vehicle 10. The vehicle 10 further includes a power transmission apparatus 16 that is provided in a power transmission path between the engine 12 and drive wheels 14. The drive wheels 14 are rear left and right wheels 14. The vehicle 10 is a front-engine rear-drive vehicle in which the engine 12 and the rotating machine MG are disposed in a front portion of the vehicle 10. The rotating machine MG corresponds to "drive rotating machine" recited in the appended claims.

The engine 12 is an internal combustion engine such as gasoline engine and diesel engine. The vehicle 10 is provided with an engine control device 50 that includes a throttle actuator, a fuel injection device and an ignition device. With the engine control device 50 being controlled by the electronic control apparatus 90, an engine torque Te, which is an output torque of the engine 12, is controlled. The rotating machine MG is a motor generator having a function serving as an electric motor configured to generate a mechanical power from an electric power and a function serving as an electric power generator configured to generate an electric power from a mechanical power. The rotating machine MG is a three-phase AC synchronous motor, for example, and is connected to a battery 54 provided in the vehicle 10, through an inverter 52 provided in the vehicle 10. The inverter 52 is controlled by the electronic control apparatus 90 whereby an MG torque Tmg as a torque of the rotating machine MG and an MG rotational speed Nmg as a rotational speed of the rotating machine MG are controlled. The rotating machine MG receives the electric power from the battery 54 through the inverter 52, and generates a drive power for driving the vehicle 10, in place of or in addition to the engine 12. Further, when being driven and rotated by the power of the engine 12 or by a driven power inputted from the drive wheels 14, the rotating machine MG is subjected to the regenerative control so as to serve as the electric power generator for generating the electric power, and so as to generate a regenerative brake if being connected to the drive wheels 14. The electric power generated by the rotating machine MG is stored in the battery 54 through the inverter 52. The battery 54 serves as an electric storage device configured to receive and supply the electric power from and to the rotating machine MG.

The power transmission apparatus 16 includes a casing 18, a K0 clutch 20, a torque converter 22 and an automatic transmission 24. In the casing 18 that is a non-rotary member attached to a body of the vehicle 10, the engine 12, the K0 clutch 20, the torque converter 22 and the automatic transmission 24 are arranged in a series in this order of description in a direction away from the engine 12. The rotating machine MG is disposed between the K0 clutch 20 and the torque converter 22 in a power transmission path between the engine 12 and the drive wheels 14. The K0 clutch 20 is an engine connecting/disconnecting device that is disposed between the engine 12 and the rotating machine MG in the power transmission path, so as to selectively connect and disconnect the engine 12 to and from the rotating machine MG and the power transmission apparatus 16. The torque converter 22 is a fluid transmission device that is disposed between the rotating machine MG and the automatic transmission 24 in the in the power transmission path, so as to transmit the power through a working fluid OIL. The torque converter 22 is connected to the engine 12 through the K0 clutch 20. The automatic transmission 24 is connected to the torque converter 22, and is disposed between the drive power sources (the engine 12 and the rotating machine MG) and the drive wheels 14 and arranged in series with the torque converter 22. The power transmission apparatus 16 further includes a propeller shaft 28 connected to a transmission output shaft 26 as an output rotary member of the automatic transmission 24, a difference gear device 30 connected to the propeller shaft 28, and a pair of drive shafts 32 connected to the differential gear device 30. The power transmission apparatus 16 still further includes an engine connection shaft 34 connecting between the engine 12 and the K0 clutch 20 and an MG connection shaft 36 connecting between the K0 clutch 20 and the torque converter 22. The MG connection shaft 36 is connected to a rotor of the rotating machine MG.

The K0 clutch 20 is, for example, a wet-type or dry-type frictional engagement device (wet-type frictional engagement device in the present embodiment) constituted by a multiple-disc type or single-disc type clutch that is to be pressed by a hydraulic actuator. A K0 torque Tk0 as a torque capacity of the K0 clutch 20 is changed by a regulated K0 hydraulic pressure PRk0 supplied to the K0 clutch 20 from a hydraulic control unit (hydraulic control circuit) 56, whereby a control or operation state of the K0 clutch 20 is switched between an engaged state and a released state, for example. When the K0 clutch 20 is in the engaged state, the rotor of the rotating machine MG and a pump impeller 22a of the torque converter 22 are rotatable integrally with the engine 12 through the engine connection shaft 34. When the K0 clutch 20 is in the released state, transmission of the power between the engine 12 and the rotor of the rotating machine MG and the pump impeller 22a of the torque converter 22 is disconnected, whereby the engine 12 can be stopped.

The torque converter 22 includes the above-described pump impeller 22a connected to the MG connection shaft 36 and a turbine impeller 22b connected to an input shaft 38 as an input rotary member of the automatic transmission 24. The pump impeller 22a is connected to the engine 12 though the K0 clutch 20, and is connected directly to the rotating machine MG. The pump impeller 22a is an input member of the torque converter 22 while the turbine impeller 22b is an output member of the torque converter 22. The MG connection shaft 36 serves also as an input rotary member of the torque converter 22. The input shaft 38 is provided integrally with a turbine shaft that is to be driven and rotated by the turbine impeller 22b, and serves also an output rotary member of the torque converter 22. The torque converter 22 further includes an LU (lockup) clutch 40 that is configured to selectively connect and disconnect between the pump impeller 22a and the turbine impeller 22b. The LU clutch 40 is a known lockup clutch, i.e., a direct clutch provided to connect between the input and output members of the torque converter 22.

An LU clutch torque Tlu as a torque capacity of the LU clutch 40 is changed by a regulated LU hydraulic pressure PRlu supplied to the LU clutch 40 from the hydraulic control unit 56, whereby a control or operation state of the LU clutch 40 is switched among a released state, a slipping state and an engaged state. In the released state, the LU clutch 40 is released whereby the torque converter 22 is placed in a torque-converter state providing a torque boosting effect. In the slipping state, the LU clutch 40 is engaged while slipping. In the engaged state, the LU clutch 40 is fully engaged whereby the pump impeller 22a and the turbine impeller 22b of the torque converter 22 are to be rotated integrally with each other. The engaged state of the LU clutch 40 is a state in which the MG connection shaft 36 as the input rotary member and the input shaft 38 as the output rotary member are directly connected to each other, and may be referred also to as "lockup state". The released state of the LU clutch 40 may be referred also to as "lockup off state".

The automatic transmission 24 is a known planetary-gear-type automatic transmission including at least one planetary gear device and a plurality of engagement devices CB. Each of the engagement devices CB is a hydraulically-operated frictional engagement device in the form of a multiple-disc type or a single-disc type clutch or brake that is to be pressed by a hydraulic actuator, or a band brake that is to be tightened by a hydraulic actuator, for example. Each of the engagement devices CB is configured to receive a CB hydraulic pressure PRcb that is a regulated hydraulic pressure supplied from the hydraulic control unit 56, whereby a CB torque Tcb, i.e., torque capacity of the engagement device CB is changed and its controlled or operation state is switched between an engaged state and a released state, for example.

The automatic transmission 24 is a step-variable automatic transmission configured to establish a selected one of a plurality of gear positions, with a corresponding one or ones of the engagement devices CB being engaged, wherein the gear positions are different from each other in gear ratio (speed ratios) $\gamma$ (=input rotational speed Ni/output rotational speed No), and wherein the plurality of gear positions include a plurality of forward-drive gear positions and a reverse-drive gear position. The automatic transmission 24 is configured to switch from one of the forward-drive gear positions to another one of the forward-drive gear positions, namely, to establish one of the forward-drive gear positions which is selected, by the electronic control apparatus 90, depending on, for example, an acceleration operation made by a vehicle driver (operator) and a running speed V of the vehicle 10. With all of the engagement devices CB being released, the automatic transmission 24 is placed in a neutral state in which transmission of the power is disconnected. The input rotational speed Ni is a rotational speed of the input shaft 38, and is an input rotational speed of the automatic transmission 24. The input rotational speed Ni is also a rotational speed of the output member of the torque converter 22, and is equal to a turbine rotational speed Nt that is an output rotational speed of the torque converter 22. The output rotational speed No is a rotational speed of the transmission output shaft 26, and is an output rotational speed of the automatic transmission 24.

In the power transmission apparatus 16, when the K0 clutch 20 is engaged, the power outputted by the engine 12 is transmitted from the engine connection shaft 34 to the differential gear device 30 through the K0 clutch 20, MG connection shaft 36, torque converter 22, automatic transmission 24 and propeller shaft 28, and is then transmitted from the differential gear device 30 to the left and right drive wheels 14 with the power being distributed by the differential gear device 30 to the left and right drive shafts 32. Further, irrespective of the operation state of the K0 clutch 20, the power outputted by the rotating machine MG is transmitted from the MG connection shaft 36 to the differential gear device 30 through the torque converter 22, automatic transmission 24 and propeller shaft 28, and is then transmitted from the differential gear device 30 to the left and right drive wheels 14 with the power being distributed by the differential gear device 30 to the left and right drive shafts 32.

The vehicle 10 includes an MOP 58 that is a mechanical fluid pump (mechanical oil pump), an EOP 60 that is an electric fluid pump (electric oil pump) and a pump motor 62. The MOP 58 is connected to the pump impeller 22a, so as to be driven and rotated by the drive power sources (engine 12 and rotating machine MG) for outputting the working fluid OIL that is used in the power transmission apparatus 16. The pump motor 62 is an electric motor exclusively serving to drive and rotate the EOP 60. The EOP 60 is to be driven and rotated by the pump motor 62 so as to output the working fluid OIL at a desired timing, for example, during stop of the vehicle 10. The working fluid OIL outputted by the MOP 58 and/or EOP 60 is supplied to the hydraulic control unit 56. The hydraulic control unit 56 outputs the CB hydraulic pressure PRcb, K0 hydraulic pressure PRk0 and LU hydraulic pressure PRlu that have been regulated based on the working fluid OIL outputted by the MOP 58 and/or EOP 60. The working fluid OIL is supplied to the torque converter 22 so as to be used for transmitting the power, and is used for lubricating and cooling various parts of the power transmission apparatus 16. The working fluid OIL is stored in a fluid storage portion such as an oil pan, which is provided below the casing 18, and the stored working fluid OIL is pumped by the MOP 58 and/or the EOP 60 so as to be supplied to the hydraulic control unit 56.

Figures 2, 3:
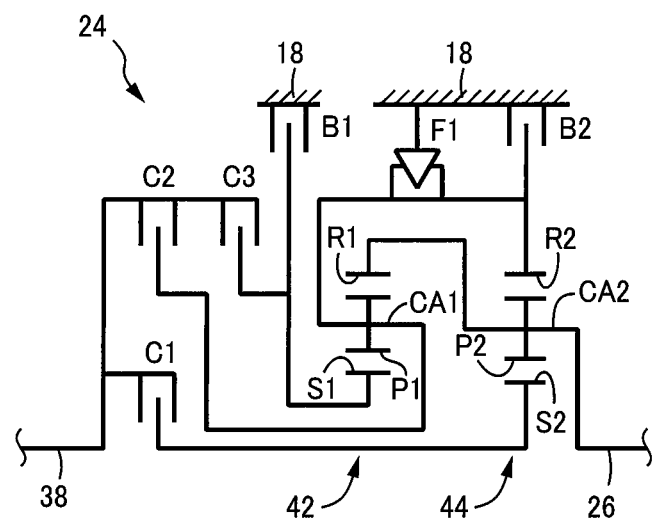
FIG. 2 is a view schematically showing an example of an automatic transmission provided in the hybrid electrically-operated vehicle shown in FIG. 1.
FIG. 3 is a table indicating a relationship between each gear position of the automatic transmission (shown in FIG. 2) and a combination of engagement devices of the automatic transmission, which are placed in engaged states to establish the gear position in the automatic transmission.

FIG. 2 is a view schematically showing an example of the automatic transmission 24 that includes first and second planetary gear devices 42, 44 of single-pinion type. The first planetary gear device 42 includes three rotary elements in the form of a first carrier CA1, a first sun gear S1 and a first ring gear R1, wherein the first carrier CA1 holds first pinions P1 such that each of the first pinions P1 is rotatable about its axis and is revolvable about an axis of the first planetary gear device 42 and such that each of the first pinions P1 meshes with the first sun gear S1 and the first ring gear R1. The second planetary gear device 44 includes three rotary elements in the form of a second carrier CA2, a second sun gear S2 and a second ring gear R2, wherein the second carrier CA2 holds second pinions P2 such that each of the second pinions P2 is rotatable about its axis and is revolvable about an axis of the second planetary gear device 44 and such that each of the second pinions P2 meshes with the second sun gear S2 and the second ring gear R2.

In the first and second planetary gear devices 42, 44, the first sun gear S1 is selectively connected to the input shaft 38 through the third clutch C3, and is selectively connected to the casing 18 through the first brake B1. The first carrier CA1 and the second ring gear R2, which are connected integrally with each other, are selectively connected to the input shaft 38 through the second clutch C2, and are connected to the casing 18 through the second brake B2. The first carrier CA1 and the second ring gear R2 are also connected to the casing 18 as the non-rotary member through a one-way clutch F1. The first ring gear R1 and the second carrier CA2, which are connected integrally with each other, are connected to the output shaft 26. The second sun gear S2 is selectively connected to the input shaft 38 through the first clutch C1. The first clutch C1, second clutch C2, third clutch C3, first brake B1 and second brake B2 correspond to the above-described engagement devices CB, and are hydraulically-operated frictional engagement devices that are to be operated by hydraulic actuators. FIG. 3 is a table indicating a relationship between each gear position of the automatic transmission 24 and a combination of ones of the engagement devices CB, which are placed in the engaged states to establish the gear position in the automatic transmission 24. As shown in the table of FIG. 3, each of the four forward-drive gear positions 1st through 4th and the reverse-drive gear position Rev is established by engagements of corresponding one of the engagement device CB, which are indicated by "o" in the table. Further, with all of the engagement devices CB being released, the automatic transmission 24 is placed in a neutral position N in which transmission of the power is disconnected. It is noted, in the table of FIG. 3, "(o)" (circle with parentheses) represents the engagement of the second brake B2 when an engine brake is to be activated.

As shown in FIG. 1, the vehicle 10 is provided with the electronic control apparatus 90 as a control apparatus that is configured to perform various control operations. The electronic control apparatus 90 includes a so-called microcomputer incorporating a CPU, a ROM, a RAM and an input-output interface. The CPU performs the various control operations of the vehicle 10, by processing various input signals, according to control programs stored in the ROM, while utilizing a temporary data storage function of the RAM. The electronic control apparatus 90 includes a plurality of computers such as an engine control computer, an MG control computer and a hydraulic control computer, as needed.

The electronic control apparatus 90 receives various input signals based on values detected by respective sensors provided in the vehicle 10. Specifically, the electronic control apparatus 90 receives: an output signal of an engine speed sensor 70 indicative of an engine rotational speed Ne that is a rotational speed of the engine 12; an output signal of a turbine speed sensor 72 indicative of a turbine rotational speed Nt that is equal to the AT input rotational speed Ni; an output signal of an output speed sensor 74 indicative of the AT output rotational speed No corresponding to the vehicle running speed V; an output signal of an MG speed sensor 76 indicative of the motor rotational speed Nm; an output signal of an accelerator-opening degree sensor 78 indicative of the accelerator opening degree (accelerator operation degree) $\theta$acc representing the amount of accelerating operation made by the vehicle driver; an output signal of a throttle-opening degree sensor 80 indicative of a throttle opening degree $\theta$th which is an opening degree of an electronic throttle valve; an output signal of a brake switch 82 indicative of a signal representing a state in which a brake pedal is being operated by the vehicle driver so as to operate wheel brakes; an output signal of a battery sensor 84 indicative of a battery temperature THbat, a battery charging/discharging electric current That and a battery voltage Vbat; an output signal of a fluid temperature sensor 86 indicative of a working-fluid temperature THoil that is a temperature of the working fluid OIL in the hydraulic control unit 56; and an output signal of a lever position sensor 88 indicative of an operation position (lever position) POSsh of a shift lever 64 provided in the vehicle 10.

The shift lever 64 is disposed in vicinity of a driver seat of the vehicle 10, and is a shift operating member that is to be operated by the vehicle driver so as to switch a shift range in which the power is transmittable in the automatic transmission 24. The shift lever 64 is to be placed by the vehicle driver into one of the operation positions POSsh that include a P position, an R position, a N position and a D position. When the shift lever 64 is placed in the P position, the automatic transmission 24 is placed in a neutral state in which the transmission of the power is disconnected and a P (parking) range is selected to mechanically inhibit rotation of the output shaft 26, wherein the neutral state is a state in which all of the engagement devices CB are released, for example. When the shift lever 64 is placed in the R position, an R (reverse) range is selected to establish the reverse-drive gear position in the automatic transmission 24. When the shift lever 64 is placed in the N position, the automatic transmission 24 is placed in the neutral state (as when the shift lever 64 is placed in the P position) and a N (neutral) range is selected. When the shift lever 64 is placed in the D position, a D (drive) range is selected to establish one of the four forward-drive gear positions 1st-4th which is to be automatically selected depending on an operation state such as the vehicle running speed V and the accelerator opening degree $\theta$acc, so as to drive the vehicle 10 with the selected one of the forward-drive gear positions. The shift lever 64 may be of a position-holding type so that the shift lever 64 is held in one of the operation positions POSsh into which the shift lever 64 has been placed. However, the shift lever 64 may be an automatic return type so that the shift lever 64 is automatically returned to a predetermined home position from one of the operation positions POSsh into which the shift lever 64 has been placed. Further, the shift operating member does not necessarily have to be constituted by the shift lever 64, but may be constituted by a push-button switch or the like for selecting one of shift ranges such as the above-described P range, R range, N range and D range.

The electronic control apparatus 90 generates various output signals to the various devices provided in the vehicle 10, such as: an engine control command signal Se that is to be supplied to the engine control device 50 for controlling the engine 12, an MG control command signal Smg that is to be supplied to the inverter 52 for controlling the rotating machine MG; a CB hydraulic control command signal Scb that is to be supplied to the hydraulic control unit 56 for controlling the operation states of the engagement devices CB; a K0 hydraulic control command signal Sk0 that is to be supplied to the hydraulic control unit 56 for controlling the K0 clutch 20; an LU hydraulic control command signal Slu that is to be supplied to the hydraulic control unit 56 for controlling the operation state of the LU clutch 40; and an EOP control command signal Seop that is to be supplied to the pump motor 62 for operating the EOP 60. The hydraulic control unit 56 is provided with a plurality of solenoid valves for switching fluid passages and controlling hydraulic pressures in accordance with the CB hydraulic control command signal Scb, K0 hydraulic control command signal Sk0 and hydraulic control command signal Slu.

For performing various controls in the electrically-operated vehicle 10, the electronic control apparatus 90 functionally includes a hybrid control portion 92, a shift control portion 94, an LU-clutch control portion 96 and a vibration-suppression control portion 98.

The hybrid control portion 92 has a function of controlling cooperative operations of the engine 12 and the rotating machine MG, and includes an engine control portion 92a configured to control the engine 12 and an MG control portion 92b configured to control the rotating machine MG. The hybrid control portion 92 calculates the drive request amount requested to the vehicle 10 by the vehicle driver, by applying the accelerator opening degree $\theta$acc and the vehicle running speed V to a drive request amount map, for example, wherein the drive request amount is a requested drive torque Trdem that is to be applied to the drive wheels 14, for example. The hybrid control portion 92 obtains a requested TC input torque Ttcdem that is a required value of the input torque required to be inputted to the torque converter 22 for realizing the requested drive torque Trdem, for example, by taking account of various factors such as a transmission loss, an auxiliary load, the gear ratio $\gamma$ of the automatic transmission 24 and a maximum chargeable amount Win and a maximum dischargeable amount Wout of the battery 54, and outputs the engine control command signal Se and the MG control command signal Smg for controlling the engine 12 and the rotating machine MG, respectively, such that the requested TC input torque Ttcdem can be obtained. The maximum chargeable amount Win and the maximum dischargeable amount Wout of the battery 54 are calculated, by the electronic control apparatus 90, based on the battery temperature THbat and the charged state value SOC [%] of the battery 54, for example. The charged state value SOC of the battery 54 is a value indicative of a charged state of the battery 54, i.e., an amount of the electric power stored or remaining in the battery 54, and is calculated by the electronic control apparatus 90, for example, based on the charging/discharging electric current That and the voltage Vbat of the battery 54.

When the requested TC input torque Ttcdem can be covered by only the output of the rotating machine MG, the hybrid control portion 92 establishes a BEV (Battery Electric Vehicle) driving mode as a motor driving mode for causing the vehicle 10 to run by driving the rotating machine MG with only the electric power supplied from the battery 54. In the BEV driving mode, a BEV driving is performed to drive the vehicle 10 by using only the rotating machine MG as the drive power source while stopping the engine 12 with the K0 clutch 20 being placed in the released state. In the BEV driving mode, the MG torque Tmg is controlled such that the requested TC input torque Ttcdem is realized. When the requested TC input torque Ttcdem cannot be covered without using at least the output of the engine 12, the hybrid control portion 92 establishes an HEV (Hybrid Electric Vehicle) driving mode as an engine driving mode for causing the vehicle 10 to run by using at least the engine 12 as the drive power source while placing the K0 clutch 20 in the engaged state. In the HEV driving mode, the engine torque Te is controlled to realize all or a part of the requested TC input torque Ttcdem by the engine torque Te, and the MG torque Tmg is also controlled to compensate an insufficiency of the engine torque Te to the requested TC input torque Ttcdem, as needed. On the other hand, even when the requested TC input torque Ttcdem can be covered by only the output of the rotating machine MG, the hybrid control portion 92 establishes the HEV driving mode, for example, in a case in which the engine 12 or other parts of the power transmission apparatus 16 is required to be warmed up. Thus, the hybrid control portion 92 is configured, during the HEV driving, to automatically stop the engine 12 and to restart the engine 12 after having stopped the engine 12, and is configured, during the BEV driving, to start the engine 12 and to automatically stop and start the engine 12 when the vehicle 10 is being stopped. Thus, the hybrid control portion 92 switches between the BEV driving mode and the HEV driving mode, depending on the requested TC input torque Ttcdem or the like.

Figure 4:
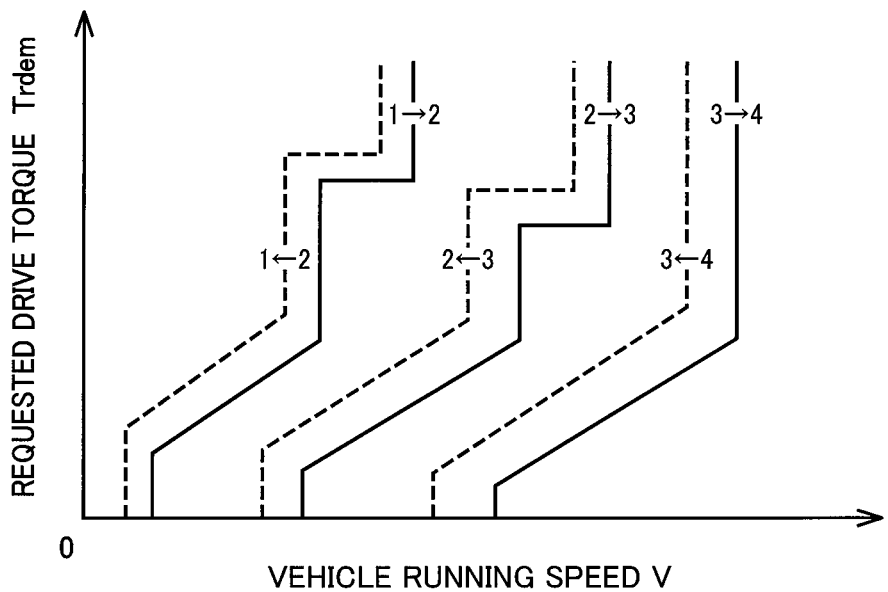
FIG. 4 is a view showing, by way of example, a shifting map to be used by a shift control portion that is functionally included in the electronic control apparatus of the hybrid electrically-operated vehicle shown in FIG. 1, for controlling gear shifting in the automatic transmission.

The shift control portion 94 is configured, when the D range is selected, to determine whether a shifting action is required or not in the automatic transmission 24, by using a shifting map or the like that is preformulated with variables (related to an operation state of the vehicle 10) such as the vehicle running speed V and the requested drive torque Trdem, and to execute an automatic shift control for outputting the CB hydraulic control command signal Scb, as needed, by which a currently established one of the forward-drive gear positions is to be automatically switched to another one of the forward-drive gear positions in the automatic transmission 24, such that the outputted CB hydraulic control command signal Scb is supplied to the hydraulic control unit 56. FIG. 4 shows an example of the shifting map that is formulated with variables in the form of the requested drive torque Trdem and the vehicle running speed V, wherein each of solid lines represents a shift-up line based on which it is determined whether a shift-up action is to be executed or not and each of broken lines represents a shift-down line based on which it is determined whether a shift-down action is to be executed or not. The shifting map is formulated such that a higher-speed gear position is to be established to reduce the gear ratio γ, with increase of the vehicle running speed V or with reduction of the requested drive torque Trdem, and such that a lower-speed gear position is to be established to increase the gear ratio γ, with reduction of the vehicle running speed V or with increase of the requested drive torque Trdem. In FIG. 4, numerals "1", "2", "3" and "4" represent a first gear position 1st, a second gear position 2nd, a third gear position 3rd and a fourth gear position 4th, respectively. It is noted that, in the shifting map of FIG. 4, the vehicle running speed V as one of the variables may be replaced by the output rotational speed No, for example, and the requested drive torque Trdem as another one of the variables may be replaced by a requested drive force Frdem or the accelerator opening degree θacc, for example.

In the automatic transmission 24 of FIG. 2, for example, as is apparent from a table of FIG. 3, any shifting action between adjacent two of the forward-drive gear positions is executed by a called "clutch-to-clutch shift" by which one of the clutches C1, C2 and the brakes B1, B2 is released and another one of the clutches C1, C2 and the brakes B1, B2 is engaged. For example, when a shift-up action for switching from the second gear position 2nd to the third gear position 3rd is to be executed, the CB hydraulic control command signal Scb is outputted to control the hydraulic pressure supplied to each of the first brake B1 and the second clutch C2 such that the first brake B1 is released while the second clutch C2 is engaged.

When a shift command signal is supplied in a response to an operation by the vehicle driver made to a manual-shift operation member such as the shift lever 64 disposed in vicinity of the driver seat, a manual shift control is executed to switch from a currently established one of the forward-drive gear positions to another one of the forward-drive gear positions in the automatic transmission 24, in accordance with the shift command signal. Moreover, when one of the operation positions POSsh is switched to another one of the operation positions POSsh by operation of the shift lever 64, a so-called "garage control" is executed for switching the shift range of the automatic transmission 24, in accordance with the another one of the operation positions POSsh.

Figure 5:
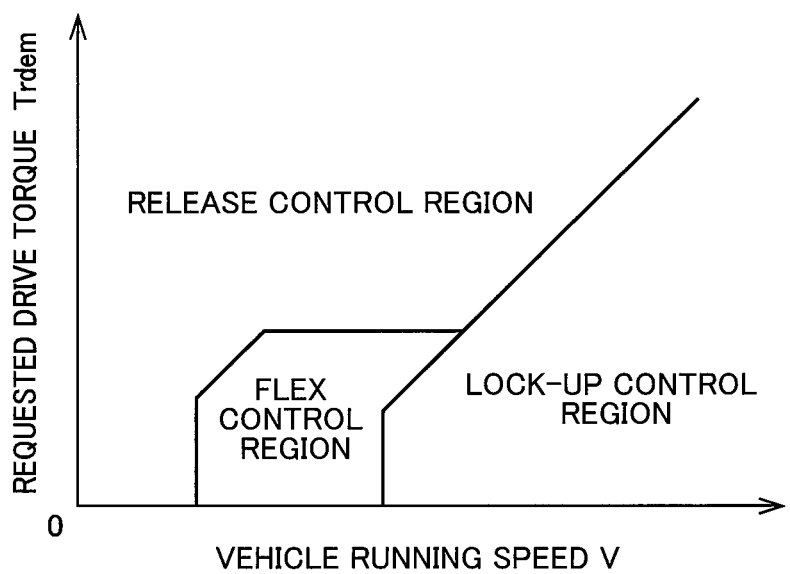
FIG. 5 is a view showing, by way of example, an LU switching map to be used by an LU-clutch control portion that is functionally included in the electronic control apparatus of the hybrid electrically-operated vehicle shown in FIG. 1, for controlling engagement and release of an LU clutch.

The LU-clutch control portion 96 is provided to switch the operation state of the LU clutch 40, and is configured to execute a lock-up control for controlling the LU hydraulic pressure PRlu that corresponds to a lock-up differential pressure of the LU clutch 40. The LU-clutch control portion 96 places the operation state of the LU clutch 40 into a selected one of the released state, slip state and engaged state, which is selected in accordance with a lock-up switch rule that is preformulated with variables in the form of the vehicle running speed V and the requested drive torque Trdem, for example, which represent an operation state of the vehicle 10. FIG. 5 shows an example of an LU switching map as the lock-up switch rule, which defines three regions depending on the variables in the form of the vehicle running speed V and the requested drive torque Trdem, wherein the three regions consist of a release control region in which a release control is to be executed to place the LU clutch 40 in the released state, a flex control region in which a flex control is to be executed to place the LU clutch 40 in the predetermined slip state and a lock-up control region in which a lock-up control is to be executed to place the LU clutch 40 in the engaged state. For example, the lock-up control region corresponds to a region in which the vehicle running speed V is relatively high, the release control region corresponds to a region in which the vehicle running speed V is relatively low, and the flex control region corresponds to a region which is between the lock-up control region and the release control region and in which the requested drive torque Trdem is relatively small. The LU-clutch control portion 96 determines the operation state of the vehicle 10 (that is defined by a combination of actual values of the vehicle running speed V and requested drive torque Trdem) is in which one of the release control region, flex control region and lock-up control region. Then, the LU-clutch control portion 96 controls the LU hydraulic control command signal Slu such that the LU clutch 40 is placed in one of the released state, slip state and engaged state, which corresponds to the above-described one of the release control region, flex control region and lock-up control region (in which the operation state of the vehicle 10 is), so that the controlled LU hydraulic control command signal Slu is outputted to the hydraulic control unit 56. In the flex control, the LU-clutch control portion 96 controls the LU hydraulic control command signal Slu such that the LU hydraulic pressure PRlu becomes substantially equal to a predetermined slip hydraulic pressure PRlusl, for example, or controls the LU hydraulic control command signal Slu in a feedback manner such that the LU clutch 40 is placed in the predetermined slip state, namely, such that an LU-clutch differential rotation ΔNlu that is a differential rotation of the LU clutch 40 becomes substantially equal to a predetermined target differential rotation ΔNsl. The LU-clutch differential rotation ΔNlu corresponds to a difference (Nmg-Ni) between the MG rotational speed Nmg and the turbine rotational speed Nt (=input rotational speed Ni), and a positive value of the difference (Nmg-Ni) and a negative value of the difference (Nmg-Ni) may be distinguished from each other, or an absolute value of the difference (Nmg-Ni) may be used if allowed by condition. It is noted that, in the LU switching map of FIG. 5, the vehicle running speed V as one of the variables may be replaced by the output rotational speed No, for example, and the requested drive torque Trdem as another one of the variables may be replaced by the requested drive force Frdem or the accelerator opening degree θacc, for example.

Apart from the lock-up control based on the above-described LU switching map, the LU-clutch control portion 96 executes a shifting-case flex control under certain conditions during the shifting action of the automatic transmission 24. That is, when the shifting action is executed in the automatic transmission 24 during the engaged state or slip state of the LU clutch 40, the LU-clutch control portion 96 controls the LU hydraulic pressure PRlu such that the LU clutch 40 is placed in a shifting-case slip state. Specifically described, the LU-clutch control portion 96 controls the LU hydraulic control command signal Slu such that the LU hydraulic pressure PRlu becomes substantially equal to a predetermined shifting-case slip hydraulic pressure PRlush, for example, or controls the LU hydraulic control command signal Slu in a feedback manner such that the LU clutch 40 is placed in a predetermined shifting-case slip state, namely, such that the LU-clutch differential rotation ΔNlu becomes substantially equal to a predetermined shifting-case target differential rotation ΔNslsh. The shifting-case slip hydraulic pressure PRlush and the shifting-case target differential rotation ΔNslsh are determined depending on a vehicle state such as which kind of the shifting action is currently executed, whether the vehicle 10 is in a driving state or a driven state, and whether the vehicle 10 is in the BEV driving mode or the HEV driving mode, by taking account of drivability (such as shift shock and acceleration responsiveness) and/or fuel economy performance. The shifting-case flex control is executed in corporation with the shift control that is executed by the shift control portion 94 to control the shifting action in the automatic transmission 24.

When torsional vibration could be caused in a drive system, i.e., the power transmission apparatus 16, for example, upon acceleration of the vehicle 10, regenerative-brake release, accelerator tip-in or tip-out, the vibration-suppression control portion 98 is configured to execute a vibration suppression control for suppressing the torsional vibration. In the present embodiment, the vibration-suppression control portion 98 estimates the torsional vibration of the power transmission apparatus 16 by using a preformulated vibration model, and controls the torque Tmg of the rotating machine MG such that the torsional vibration is suppressed. Since the torsional vibration varies in characteristics depending on which one of the HEV driving mode (in which the K0 clutch 20 is engaged) and the BEV driving mode (in which the K0 clutch 20 is released) is being established, two kinds of the vibration models, i.e., a K0-engaged-case vibration model Mhev and a K0-released-case vibration model Mbev, are prepared for a case of engagement of the K0 clutch 20 and a case of release of the K0 clutch 20, respectively, so that the vibration suppression control is executed by using the K0-engaged-case vibration model Mhev in the HEV driving mode, and is executed by using the K0-released-case vibration model Mbev in the BEV driving mode. The vibration suppression control is executed in a predetermined case that requires execution of the vibration suppression control, such as a case of high probability of generation of the torsional vibration. It is noted that, since the vibration suppression control is executed by controlling the MG torque Tmg, the vibration suppression control will be referred also to as "MG vibration suppression".

Figure 6A:
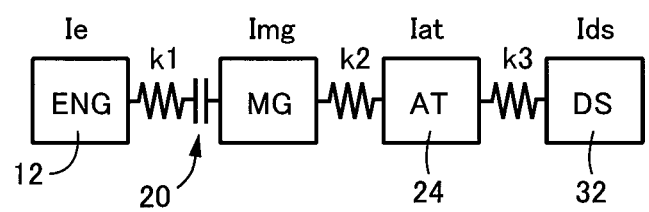
FIGS. 6A and 6B are views showing, by way of examples, two kinds of vibration models to be used by a vibration-suppression control portion that is functionally included in the electronic control apparatus of the hybrid electrically-operated vehicle shown in FIG. 1, for executing a vibration suppression control.
Figure 6B:
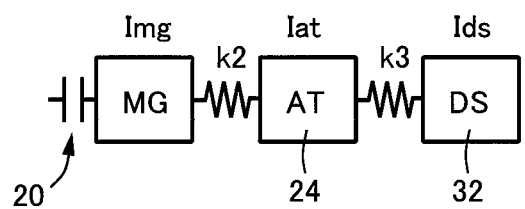

FIGS. 6A and 6B are views showing, by way of examples, the K0-engaged-case vibration model Mhev and the K0-released-case vibration model Mbev, wherein "Ie" represents a rotational inertia of the engine 12, "Img" represents a rotational inertia of the rotating machine MG, "Iat" represents a rotational inertia of the automatic transmission 24 and "Ids" represents a rotational inertia of the drive shaft 32. These rotational inertias are calculated, for example, based on actual rotational speeds of the corresponding parts. Further, in FIGS. 6A and 6B, "k1", "k2" and "k3" are spring constants each of which is a predetermined constant value. Then, for example, resonance frequencies ωhev, ωbev and torsion amounts σhev, σbev related to the torsional vibration are calculated based on the vibration models Mhev, Mbev, and the MG torque Tmg is controlled in a feedforward manner such that a damping torque (vibration suppression torque) Tmgvib is outputted from the rotating machine MG for cancelling the torsional vibration. That is, the rotating machine MG is controlled to output the MG torque Tmg that corresponds to a sum of a normally-requested MG torque Tmgdem (that is calculated based on the requested TC input torque Ttcdem) and the damping torque Tmgvib added to cancel the torsional vibration. The vibration models Mhev, Mbev shown in FIGS. 6A and 6B are just examples, and may be replaced by other vibration models using other physical quantities such as damping coefficients.

The transmission of the power is disconnected or limited during the shift control of the automatic transmission 24 or during the disengaged state of the LU clutch 40 by execution of a non-lock-up control such as the release control and the flex control. Regarding the automatic transmission 24 that is constructed as shown in FIG. 2, the shift control is executed by the clutch-to-clutch shift of the engagement devices CB, so that the transmission of the power is temporarily interpreted or limited when the operation states of the engagement devices CB are switched. If the MG vibration suppression were made in a state in which the transmission of the power is disconnected or limited, the MG rotational speed Nmg could be excessively increased or reduced by the control of the torque of the rotating machine MG, whereby the NV could be increased. Therefore, it is preferable to suspend the MG vibration suppression in such a state in which the transmission of the power is disconnected or limited. On the other hand, the effect of the MG vibration suppression is obtained with a certain delay, because data collected for a certain length of time to a current point of time is required to estimate the torsional vibration by the vibration models Mhev, Mbev. If the MG vibration suppression is suspended until the shift control of the automatic transmission 24 is completed or until the LU clutch 40 is brought into the engaged state from the disengaged state, the MG vibration suppression is practically ineffective for a large length of time that corresponds to a sum of a time of collection of the data and a time of inhibition of the execution of the MG vibration suppression during the shift control of the automatic transmission 24 or during the non-lock-up control of the LU clutch 40, so that the torsional vibration could be undesirably increased. In the present embodiment, each of the LU clutch 40 and the engagement devices CB corresponds to "frictional engagement element" recited in the appended claims. Further, the LU clutch 40 and the LU-clutch control portion 96 correspond to "direct clutch" and "direct-clutch control portion", respectively, which are recited in the appended claims.

However, in the present embodiment, the vibration-suppression control portion 98 includes a vibration-suppression allowing/inhibiting portion 98a configured to determine whether the execution of the MG vibration suppression is to be allowed or inhibited, such that, even during the shift control of the automatic transmission 24 or during the flex control of the LU clutch 40, the execution of the MG vibration suppression can be allowed under a certain condition that avoids inconvenience such as increase of the NV that could be caused by the execution of the MG vibration suppression during the shift control of the automatic transmission 24 or during the flex control of the LU clutch 40. The vibration-suppression allowing/inhibiting portion 98a makes a determination as to whether the execution of the MG vibration suppression is to be allowed or inhibited, such that the determination is made by executing a control routine including steps S1 through S8 that are shown in a flow chart of FIG. 7, so that the MG vibration suppression is executed when it is determined that the execution of the MG vibration suppression is to be allowed. It is noted that, in the flow chart of FIG. 7, "YES" and "NO" in each of determination steps S1 through S6 (represented by rhombus shapes) represent affirmative determination and negative determination, respectively.

Figure 7:
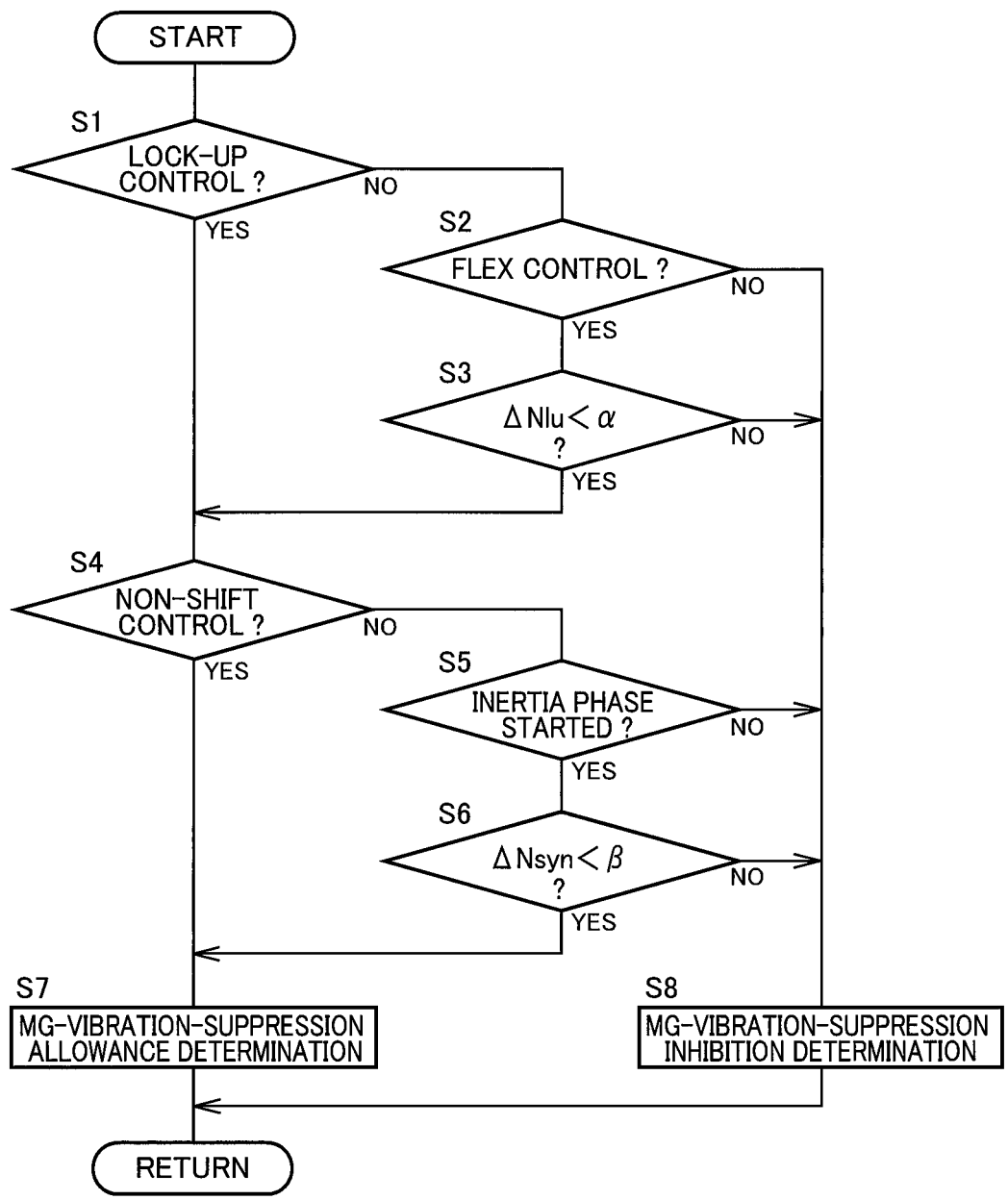
FIG. 7 is a flow chart showing a control routine to be executed by a vibration-suppression allowing/inhibiting portion that is functionally included in the electronic control apparatus of the hybrid electrically-operated vehicle shown in FIG. 1.

The control routine shown in the flow chart of FIG. 7 is initiated with step S1 that is implemented to determine whether the LU-clutch control portion 96 is executing the lock-up control for keeping the LU clutch 40 in the engaged state, or not. When the lock-up control is being executed, namely, when the LU clutch 40 is in the engaged state, the control flow goes to step S4. When the lock-up control is not being executed, step S2 is implemented to determine whether the LU-clutch control portion 96 is executing the flex control (including the shifting-case flex control) or not. When the flex control is not being executed, namely, when the release control is being executed, the control flow goes to step S8 to make an MG-vibration-suppression inhibition determination for inhibiting the execution of the MG vibration suppression. When the LU-clutch control portion 96 is executing the flex control, step S2 is followed by step S3 that is implemented to determine whether the LU-clutch differential rotation $\Delta$Nlu is smaller than an LU-clutch-operation-related determination value $\alpha$ or not. When the LU-clutch differential rotation $\Delta$Nlu is smaller than the threshold value $\alpha$ ($\Delta$Nlu<$\alpha$), step S3 is followed by step S4. When the LU-clutch differential rotation $\Delta$Nlu is not smaller than the threshold value $\alpha$ ($\Delta$nlu$\geq$$\alpha$), the control flow goes to step S8 to make the MG-vibration-suppression inhibition determination. The LU-clutch-operation-related determination value $\alpha$ is determined, through an experimentation or the like, such that the LU clutch 40 has at least a certain value of the LU clutch torque Tlu so that the MG rotational speed Nmg is not excessively increased or reduced by the execution of the MG vibration suppression, as long as the LU-clutch differential rotation $\Delta$Nlu is smaller than the determined LU-clutch-operation-related determination value $\alpha$. The LU-clutch-operation-related determination value $\alpha$ is set to about 20-1000 rpm, for example. At step S3, the LU-clutch differential rotation $\Delta$Nlu could be smaller than the threshold value $\alpha$ ($\Delta$Nlu<$\alpha$) both in a transition of the LU clutch 40 from the engaged state to the slip state and in a transition of the LU clutch 40 from the slip state to the engaged state. Therefore, the LU-clutch-operation-related determination value $\alpha$ may be set to a value that varies depending on whether the LU clutch 40 is in the transition to the slip state or in the transition to the engaged state. The LU-clutch differential rotation $\Delta$Nlu corresponds to "differential rotation of the direct clutch" recited in the appended claims. The LU-clutch-operation-related determination value $\alpha$ corresponds to "direct-clutch-operation-related determination value" recited in the appended claims.

Figure 8:
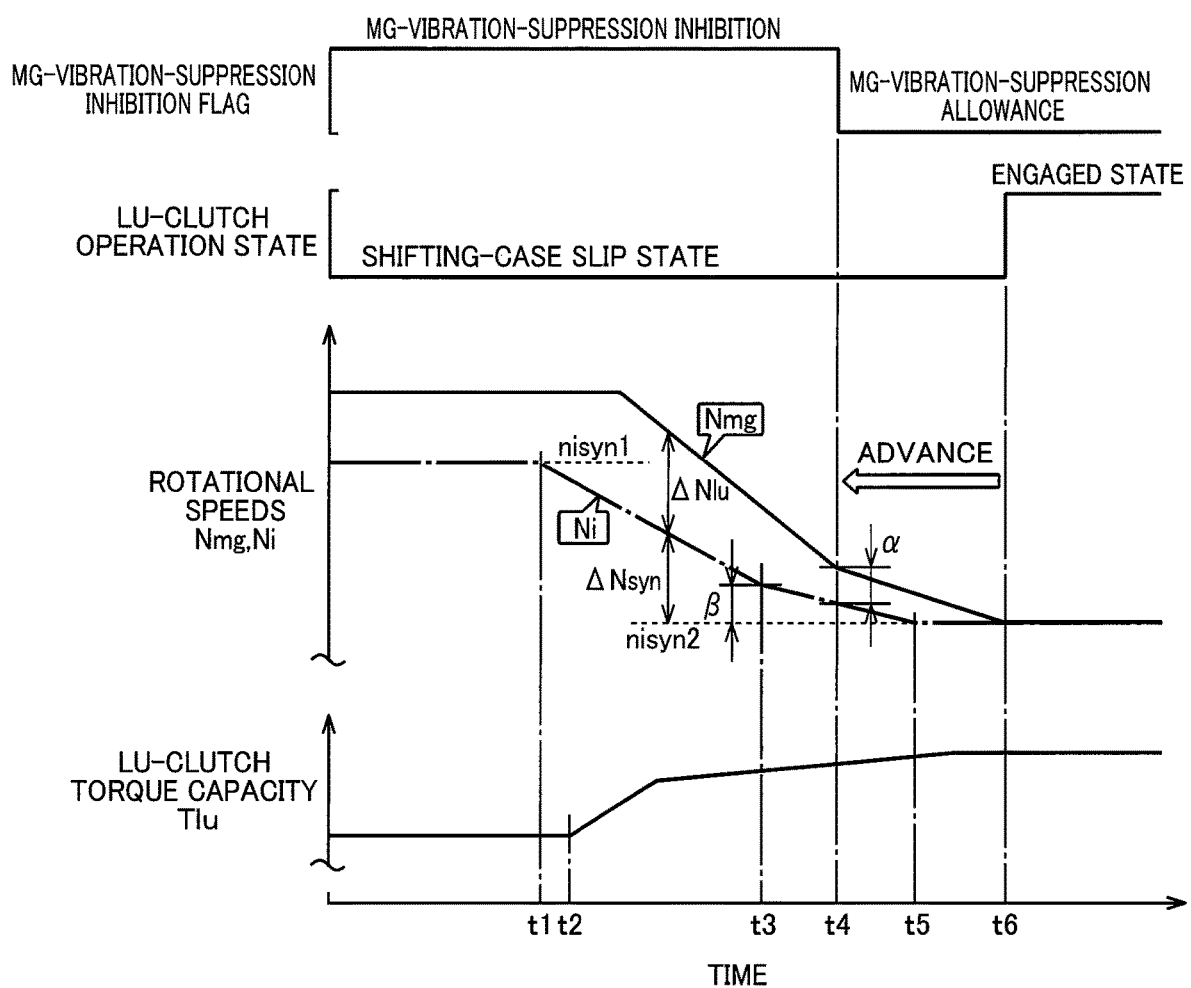
FIG. 8 is an example of time chart showing changes of operation states of respective parts in a case in which execution of the vibration suppression control is allowed and inhibited by executing the control routine shown by the flow chart of FIG. 7, when a shift control is executed in the automatic transmission during execution of a flex control for placing the LU clutch in a slip state.

At step S4, it is determined whether the shift control portion 94 is executing a non-shift control (that is not the shift control for switching the gear positions of the automatic transmission 24) or not. If the non-shift control is being executed, the control flow goes to step S7 that is implemented to make an MG-vibration-suppression allowance determination for allowing the execution of the MG vibration suppression. On the other hand, when the shift control portion 94 is executing the shift control, step S4 is followed by step S5 that is implemented to determine whether an inertia phase has been started or not in process of the shift control. This determination can be made based on rotational speeds indicated in FIG. 8, specifically, depending on whether the input rotational speed Ni has become different from a pre-shifting synchronization rotational speed nisyn1 or not in process of a shift-up action. In FIG. 8, a time point t1 represents a point of time at which the inertia phase has been started. The pre-shifting synchronization rotational speed nisyn1 can be calculated by multiplying the output rotational speed No by the gear ratio $\gamma$ provided by the gear position established before the shift-up action. When the inertia phase has not yet started, the control flow goes to step S8 that is implemented to make the MG-vibration-suppression inhibition determination. When the inertia phase has been started, step S5 is followed by step S6. It is also possible to make, in addition to or in place of the determination as to whether the inertia phase has been started or not, a determination as to whether a predetermined time has elapsed from start of execution of the shift control or not and/or whether a torque phase has been terminated or not, for example.

At step S6, it is determined whether a synchronization differential rotation ΔNsyn (that is to be zeroed upon completion of the shift control) has become smaller than a predetermined engagement-device-operation-related determination value β, or not. The synchronization differential rotation ΔNsyn is a differential rotation between the input rotational speed Ni and a post-shifting synchronization rotational speed nisyn2 (see FIG. 8), and corresponds to a differential rotation of a shifting-execution engagement device CBsh, which is one of the engagement devices CB that is to be engaged in the shift control. For example, in a case in which a shift-up action is executed to switch from the second gear position 2nd to the third gear position 3rd in the automatic transmission 24 of FIG. 2, when the differential rotation of the second clutch C2, which is the shifting-execution engagement device CBsh, has become zero with the second clutch C2 being engaged, the shift control for this shift-up action is completed with the synchronization differential rotation ΔNsyn having become zero. At step S6, it is also possible to detect the differential rotation of the shifting-execution engagement device CBsh and to determine whether the detected differential rotation has become smaller than a predetermined engagement-device-operation-related determination value, or not. The post-shifting synchronization rotational speed nisyn2 can be calculated by multiplying the output rotational speed No by the gear ratio γ provided by the gear position established after the shift-up action. When the synchronization differential rotation ΔNsyn is smaller than the engagement-device-operation-related determination value β (ΔNsyn<β), step S7 is implemented to make the MG-vibration-suppression allowance determination. When the synchronization differential rotation ΔNsyn is not smaller than the engagement-device-operation-related determination value β(ΔNsyn≥β), step S8 is implemented to make the MG-vibration-suppression inhibition determination. The engagement-device-operation-related determination value β is determined, through an experimentation or the like, such that the shifting-execution engagement device CBsh has at least a certain value of the CB torque Tcb so that the MG rotational speed Nmg is not excessively increased or reduced by the execution of the MG vibration suppression, as long as the synchronization differential rotation ΔNsyn is smaller than the determined engagement-device-operation-related determination value β. The engagement-device-operation-related determination value β is set to about 20-1000 rpm, for example. The engagement-device-operation-related determination value β may be set to either a constant value or a variable value that is variable depending on the vehicle state such as which kind of the shifting action is currently executed and whether the vehicle 10 is in the driving state or the driven state.

Thus, step S7 is executed to allow the execution of the MG vibration suppression, when an engagement-device-operation-related allowance condition and a direct-clutch-operation-related allowance condition are both satisfied, wherein the engagement-device-operation-related allowance condition is satisfied (i) when the automatic transmission 24 is in the non-shift control and (ii) when the synchronization differential rotation ΔNsyn is smaller than the engagement-device-operation-related determination value β after start of the inertia phase even with the automatic transmission 24 being in the shift control, and wherein the direct-clutch-operation-related allowance condition is satisfied (iii) when the LU clutch 40 is in the lock-up control so as to be placed in the engaged state and (iv) when the LU clutch 40 is in the flex control whereby the LU-clutch differential rotation ΔNlu is smaller than the LU-clutch-operation-related determination value α even with the LU clutch 40 being in the disengaged state. Step S8 is executed to inhibit the execution of the MG vibration suppression, when either an engagement-device-operation-related inhibition condition or a direct-clutch-operation-related inhibition condition is satisfied, wherein the engagement-device-operation-related inhibition condition is satisfied (v) when the synchronization differential rotation ΔNsyn is not smaller than the engagement-device-operation-related determination value β with the automatic transmission 24 being in the shift control, and wherein the direct-clutch-operation-related inhibition condition is satisfied (vi) when the LU-clutch differential rotation ΔNlu is not smaller than the direct-clutch-operation-related determination value α even with the LU clutch 40 being in the flex control so as to be in the slip state.

FIG. 8 is an example of time chart showing changes of operation states of respective parts in a case in which the execution of the MG vibration suppression is selectively allowed and inhibited by executing the control routine shown by the flow chart of FIG. 7, when the shift control is executed to execute a shift-up action in the automatic transmission 24 during execution of the flex control for placing the LU clutch 40 in the slip state. In FIG. 8, a time point t1 represents a point of time at which the inertia phase is started by the shift control, a time point t2 represents a point of time at which a transition control is started to switch the LU clutch 40 from the slip state to the engaged state, a time point t3 represents a point of time at which the synchronization differential rotation ΔNsyn becomes smaller than the engagement-device-operation-related determination value β, a time point t4 represents a point of time at which the LU-clutch differential rotation ΔNlu becomes smaller than the LU-clutch-operation-related determination value α, a time point t5 represents a point of time at which the shift-up action is completed, a time point t6 represents a point of time at which the LU clutch 40 is placed into the engaged state (in which the LU clutch 40 is completely engaged) and the lock-up control is started to keep the engaged state of the LU clutch 40. In this example, until the time point t4, steps S1, S2, S3 and S8 are implemented whereby the MG-vibration-suppression inhibition determination is made. At the time point t4 at which the LU-clutch differential rotation ΔNlu becomes smaller than the threshold value α (ΔNlu<α), an affirmative determination (YES) is made at step S3, whereby step S3 is followed by steps S4 through S7 so that the MG-vibration-suppression allowance determination is made for thereby enabling the execution of the MG vibration suppression. At the time point t5, the shift control is completed and accordingly an affirmative determination (YES) is made at step S4, whereby step S4 is followed by step S7 to make the MG-vibration-suppression allowance determination. Further, at the time point t6, the LU clutch 40 is placed in the engaged state and the lock-up control is started to be executed, whereby an affirmative determination (YES) is made at step S1, and step S1 is followed by steps S4 and S7 so that the MG-vibration-suppression allowance determination is made.

Figure 9:
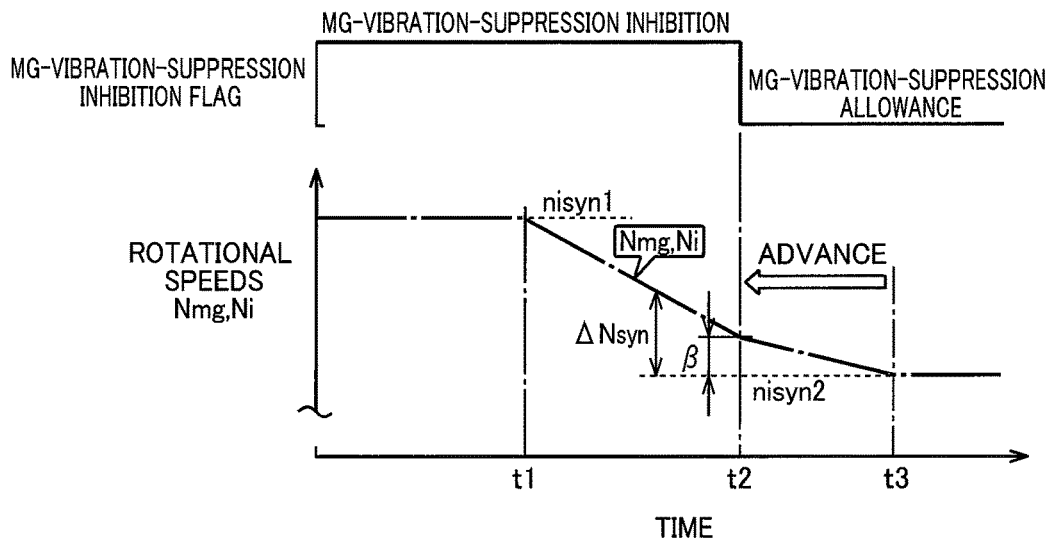
FIG. 9 is an example of time chart showing changes of operation states of respective parts in a case in which execution of the vibration suppression control is allowed and inhibited by executing the control routine shown by the flow chart of FIG. 7, when the shift control is executed in the automatic transmission during execution of a lock-up control for placing the LU clutch in an engaged state.

FIG. 9 is an example of time chart showing changes of operation states of respective parts in a case in which execution of the MG vibration suppression is selectively allowed and inhibited by executing the control routine shown by the flow chart of FIG. 7, when the shift control is executed to execute a shift-up action in the automatic transmission 24 during execution of the lock-up control for placing the LU clutch 40 in the engaged state. In FIG. 9, a time point t1 represents a point of time at which the inertia phase is started by the shift control, a time point t2 represents a point of time at which the synchronization differential rotation ΔNsyn becomes smaller than the engagement-device-operation-related determination value β, and a time point t3 represents a point of time at which the shift-up action is completed. In this example, until the time point t1, steps S1 and S4 are followed by steps S5 and S8 that are implemented whereby the MG-vibration-suppression inhibition determination is made. Then, at the time point t1, the inertia phase is started whereby an affirmative determination (YES) is made at step S5, and step S5 is followed by steps S6 and S8 that are implemented to make the MG-vibration-suppression inhibition determination. At the time point t2 at which the synchronization differential rotation ΔNsyn becomes smaller than the engagement-device-operation-related determination value β (ΔNsyn<β), an affirmative determination (YES) is made at step S6, and step S6 is followed by step S7 that is implemented to make the MG-vibration-suppression allowance determination thereby enabling the execution of the MG vibration suppression. Further, at the time point t3 at which the shift-up action is completed, an affirmative determination (YES) is made at step S4 and step S4 is followed by step S7 so that the MG-vibration-suppression allowance determination is made.

Figure 10:
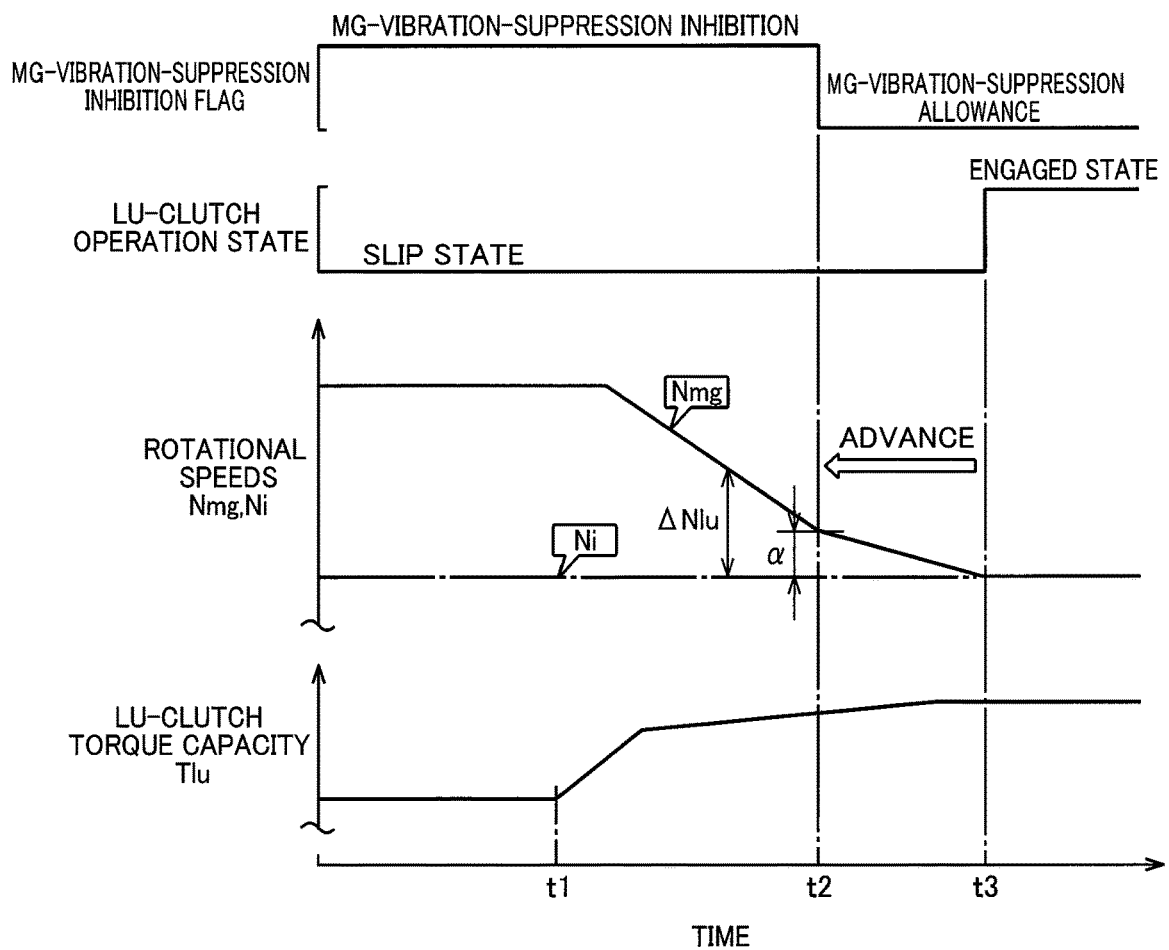
FIG. 10 is an example of time chart showing changes of operation states of respective parts in a case in which execution of the vibration suppression control is allowed and inhibited by executing the control routine shown by the flow chart of FIG. 7, when the shift control is not executed in the automatic transmission during execution of the flex control for placing the LU clutch in the slip state.

FIG. 10 is an example of time chart showing changes of operation states of respective parts in a case in which execution of the MG vibration suppression is selectively allowed and inhibited by executing the control routine shown by the flow chart of FIG. 7, when the automatic transmission 24 is in the non-shift control during execution of the flex control for placing the LU clutch 40 in the slip state. In FIG. 10, a time point t1 represents a point of time at which at which the transition control is started to switch the LU clutch 40 from the slip state to the engaged state, a time point t2 represents a point of time at which the LU-clutch differential rotation ΔNlu becomes smaller than the LU-clutch-operation-related determination value α, and a time point t3 represents a point of time at which the LU clutch 40 is placed into the engaged state (in which the LU clutch 40 is completely engaged). In this example, while the LU-clutch differential rotation ΔNlu is not smaller than the threshold value α (ΔNlu≥α) until the time point t2, steps S1, S2, S3 and S8 are implemented whereby the MG-vibration-suppression inhibition determination is made. At the time point t2 at which the LU-clutch differential rotation ΔNlu becomes smaller than the threshold value α (ΔNlu<α), an affirmative determination (YES) is made at step S3, whereby step S3 is followed by steps S4 through S7 so that the MG-vibration-suppression allowance determination is made for thereby enabling the execution of the MG vibration suppression. At the time point t3, the LU clutch 40 is placed in the engaged state and the lock-up control is started to be executed, whereby an affirmative determination (YES) is made at step S1, and step S1 is followed by steps S4 and S7 so that the MG-vibration-suppression allowance determination is made.

As described above, the vibration-suppression control portion 98, which is functionally included in the electronic control apparatus 90 of the electrically-operated vehicle 10 in the present embodiment, is configured to allow the execution of the MG vibration suppression at step S7, in a case in which the direct-clutch-operation-related allowance condition and the engagement-device-operation-related allowance condition are both satisfied (YES in the determination at step S1 or step S3 and YES in the determination at step S4 or step S6), namely, in a case in which the LU clutch 40 is in the engaged state (YES in the determination at step S1) or the LU-clutch differential rotation ΔNlu of the LU clutch 40 is smaller than the LU-clutch-operation-related determination value α (YES in the determination at step S3) even with the LU clutch 40 being in the disengaged state (NO in the determination at step S1), and the automatic transmission 24 is not in the shift control (YES in the determination at step S4) or the synchronization differential rotation ΔNsyn of the shifting-execution engagement device is smaller than the engagement-device-operation-related determination value β (YES in the determination at step S6) even with the automatic transmission 24 being in the shift control (NO in the determination at step S4). In other words, in a case in which the direct-clutch-operation-related allowance condition is satisfied (YES in the determination at step S1 or step S3), the execution of the MG vibration suppression is allowed at step S7 when the automatic transmission 24 is not in the shift control (YES in the determination at step S4) or the synchronization differential rotation ΔNsyn of the shifting-execution engagement device has become smaller than the engagement-device-operation-related determination value β (YES in the determination at step S6) after start of the inertia phase even with the automatic transmission 24 being in the shift control (NO in the determination at step S4), so that it is possible to reduce the ineffective period of the MG vibration suppression during execution of the shift control and accordingly to suppress increase of the torsional vibration. That is, the MG vibration suppression is started in advance at a point of time (at the time point t2 in FIG. 9) at which the synchronization differential rotation ΔNsyn has become smaller than the engagement-device-operation-related determination value β shortly before completion of the shift control, so that it is possible to more suppress increase of the torsional vibration due to delay of effect of the MG vibration suppression, as compared with a control arrangement in which the MG vibration suppression is not started until at a point of time (at the time point t3 in FIG. 9) at which the shift control is completed. Since the shifting-execution engagement device CBsh already has a certain amount of torque capacity when the synchronization differential rotation ΔNsyn has become smaller than the engagement-device-operation-related determination value β, the MG vibration suppression can be executed without excessive increase or reduction of the MG rotational speed Nmg, which could undesirably increase the NV.

Further, in a case in which the engagement-device-operation-related allowance condition is satisfied (YES in the determination at step S4 or step S6), the execution of the MG vibration suppression is allowed at step S7 when the LU clutch 40 is in the engaged state (YES in the determination at step S1) or the LU-clutch differential rotation ΔNlu of the LU clutch 40 is smaller than the LU-clutch-operation-related determination value α (YES in the determination at step S3) during the flex control even with the LU clutch 40 being in the disengaged state (NO in the determination at step S1), so that it is possible to reduce the ineffective period of the MG vibration suppression during the disengaged state of the LU clutch 40 and accordingly to suppress increase of the torsional vibration. That is, the MG vibration suppression is started in advance at a point of time (at the time point t4 in FIG. 8, at the time point t2 in FIG. 10) at which the LU-clutch differential rotation ΔNlu has become smaller than LU-clutch-operation-related determination value α, so that it is possible to more suppress increase of the torsional vibration due to delay of effect of the MG vibration suppression, as compared with a control arrangement in which the MG vibration suppression is not started until at a point of time (at the time point t6 in FIG. 8, at the time point t3 in FIG. 10) at which the LU clutch 40 is placed into the engaged state. Since the LU clutch 40 already has a certain amount of torque capacity when the LU-clutch differential rotation ΔNlu has become smaller than the LU-clutch-operation-related determination value α, the MG vibration suppression can be executed without excessive increase or reduction of the MG rotational speed Nmg, which could undesirably increase the NV. Further, the execution of the MG vibration suppression is allowed as long as the LU-clutch differential rotation ΔNlu is smaller than the LU-clutch-operation-related determination value α shortly after start of the transition control for switching the LU clutch 40 from the engaged state to the slip state, so that the ineffective period of the vibration suppression control is further reduced.

Further, the execution of the MG vibration suppression is inhibited when either the engagement-device-operation-related inhibition condition or the direct-clutch-operation-related inhibition condition is satisfied, namely, the execution of the MG vibration suppression is inhibited by implementation of step S8, when the LU clutch 40 is in the release control to be placed in the disengaged state (NO in the determination at step S1) or the LU-clutch differential rotation ΔNlu is not smaller than the clutch-operation-related determination value α even with the LU clutch 40 being in the flex control to be placed in the slip state, and also when the synchronization differential rotation ΔNsyn is not smaller than the engagement-device-operation-related determination value β with the automatic transmission 24 being in the shift control (NO in the determination at step S4). Thus, even when one of the differential rotation ΔNlu and the differential rotation ΔNsyn is smaller than a corresponding one of the determination value α, β, the MG vibration suppression is not executed so that it is possible to prevent increase of the NV due to excessive increase or reduction of the MG rotational speed Nmg that could be caused by execution of the MG vibration suppression.

It is noted that, in the above-described embodiment, steps S2 and S5 may be omitted in the control routine shown in the flow chart of FIG. 7.

It is to be understood that the embodiment described above is given for illustrative purpose only, and that the present invention may be embodied with various modifications and improvements which may occur to those skilled in the art.

NOMENCLATURE OF ELEMENTS

10: hybrid electrically-operated vehicle (vehicle)
12: engine (drive power source)
14: drive wheel
16: power transmission apparatus
24: automatic transmission (transmission)
40: LU clutch (direct clutch, frictional engagement element)
90: electronic control apparatus (control apparatus)
94: shift control portion
96: LU-clutch control portion (direct-clutch control portion)
98: vibration-suppression control portion
98a: vibration-suppression allowing/inhibiting portion
MG: rotating machine (drive rotating machine, drive power source)
CB: engagement device (frictional engagement device, frictional engagement element)
Mhev: K0-engaged-case vibration model (vibration model)
Mbev: K0-released-case vibration model (vibration model)
ΔNsyn: synchronization differential rotation (differential rotation of shifting-execution engagement device)
ΔNlu: LU-clutch differential rotation (differential rotation of direct clutch)
α: LU-clutch-operation-related determination value (direct-clutch-operation-related determination value, determination value)
β: engagement-device-operation-related determination value (engagement-device-operation-related determination value, determination value)

What is claimed is:

1. A control apparatus for a vehicle that includes a drive power source, drive wheels, and a power transmission apparatus which is disposed between the drive power source and the drive wheels and which includes a frictional engagement element configured to connect and disconnect transmission of a power between the drive power source and the drive wheels, the control apparatus comprising a processor configured to:
  execute a vibration suppression control for estimating torsional vibration of the power transmission apparatus, based on a preformulated vibration model, and controlling a torque of a rotating machine that is connected to the power transmission apparatus, so as to suppress the torsional vibration;
  allow and inhibit execution of the vibration suppression control;
  allow the execution of the vibration suppression control, when the frictional engagement element is in an engaged state, and when a differential rotation of the frictional engagement element has become smaller than a predetermined determination value even with the frictional engagement element being in a disengaged state; and
  inhibit the execution of the vibration suppression control, when the differential rotation of the frictional engagement element is not smaller than the predetermined determination value with the frictional engagement element being in the disengaged state.

2. The control apparatus according to claim 1,
wherein the power transmission apparatus includes a transmission which includes a plurality of frictional engagement devices each constituted by the frictional engagement element and which is configured to establish a plurality of gear positions providing respective different gear ratios, depending on operation states of the frictional engagement devices, and
wherein the processor is further configured to:
  switch the gear positions of the transmission, by controlling operation states of the frictional engagement devices;
  allow the execution of the vibration suppression control, when the transmission is not in a shift control for switching from one of the gear positions to another of the gear positions, and when the differential rotation of a shifting-execution engagement device, which is one of the frictional engagement devices that is to be engaged in the shift control, has become smaller than an engagement-device-operation-related determination value as the predetermined determination value even with the transmission being in the shift control; and inhibit the execution of the vibration suppression control, when the differential rotation of the shifting-execution engagement device is not smaller than the engagement-device-operation-related determination value with the transmission being in the shift control.

3. The control apparatus according to claim 1, wherein the power transmission apparatus includes a direct clutch that is constituted by the frictional engagement element, and wherein the processor is further configured to:

control an operation state of the direct clutch;

allow the execution of the vibration suppression control, when the direct clutch is in the engaged state, and when the differential rotation of the direct clutch is smaller than a direct-clutch-operation-related determination value as the predetermined determination value even with the direct clutch being in the disengaged state; and inhibit the execution of the vibration suppression control, when the differential rotation of the direct clutch is not smaller than the direct-clutch-operation-related determination value with the direct clutch being in the disengaged state.

4. The control apparatus according to claim 1, wherein the power transmission apparatus includes (a) a direct clutch that is constituted by the frictional engagement element and (b) a transmission which includes a plurality of frictional engagement devices each constituted by the frictional engagement element and which is configured to establish a plurality of gear positions providing respective different gear ratios, depending on operation states of the frictional engagement devices each constituted by the frictional engagement element, such that the direct clutch and the transmission are arranged in a series with each other, wherein the processor is further configured to:

switch the gear positions of the transmission, by controlling operation states of the frictional engagement devices, and to control an operation state of the direct clutch; and allow the execution of the vibration suppression control, when an engagement-device-operation-related allowance condition and a direct-clutch-operation-related allowance condition are both satisfied, wherein the engagement-device-operation-related allowance condition is satisfied (i) when the transmission is not in a shift control for switching from one of the gear positions to another of the gear positions, and (ii) when the differential rotation of a shifting-execution engagement device, which is one of the frictional engagement devices that is to be engaged in the shift control, is smaller than an engagement-device-operation-related determination value as the predetermined determination value, even with the transmission being in the shift control, wherein the direct-clutch-operation-related allowance condition is satisfied (iii) when the direct clutch is in the engaged state, and (iv) when the differential rotation of the direct clutch is smaller than a direct-clutch-operation-related determination value as the predetermined determination value even with the direct clutch being in the disengaged state, wherein the processor is configured to inhibit the execution of the vibration suppression control, when either an engagement-device-operation-related inhibition condition or a direct-clutch-operation-related inhibition condition is satisfied, wherein the engagement-device-operation-related inhibition condition is satisfied (v) when the differential rotation of the shifting-execution engagement device is not smaller than the engagement-device-operation-related determination value with the transmission being in the shift control, and wherein the direct-clutch-operation-related inhibition condition is satisfied (vi) when the differential rotation of the direct clutch is not smaller than the direct-clutch-operation-related determination value with the direct clutch being in the disengaged state.

5. The control apparatus according to claim 1, wherein the vehicle is an electrically-operated vehicle including a drive rotating machine as the drive power source, and wherein the processor is configured to execute the vibration suppression control by controlling the torque of the drive rotating machine as the rotating machine.

* * * * *